United States Patent [19]

Ball

[11] Patent Number: 4,998,504
[45] Date of Patent: Mar. 12, 1991

[54] DISPOSABLE PET LITTER BOX

[76] Inventor: Steven Ball, 1512 Courtney Oak, Knoxville, Tenn. 37938

[21] Appl. No.: 484,981

[22] Filed: Feb. 26, 1990

[51] Int. Cl.$^5$ ............................................. A01K 23/00
[52] U.S. Cl. ...................................... 119/168; 119/169
[58] Field of Search .............................................. 119/1

[56] References Cited

U.S. PATENT DOCUMENTS

| | | | |
|---|---|---|---|
| 3,745,975 | 7/1973 | Prucha | 119/1 |
| 4,164,314 | 8/1979 | Edgar | 119/1 X |
| 4,209,945 | 7/1980 | Dent et al. | 119/1 X |
| 4,308,825 | 1/1982 | Stepanian | 119/1 |
| 4,501,226 | 2/1985 | Bienvenu et al. | 119/1 |
| 4,541,360 | 9/1985 | Higgins et al. | 119/1 |
| 4,627,382 | 12/1986 | Muzzey | 119/1 |
| 4,784,083 | 11/1988 | Kiel | 119/1 |
| 4,807,564 | 2/1989 | Soberg et al. | 119/1 |
| 4,846,105 | 7/1989 | Caldwell | 119/1 |

Primary Examiner—Robert P. Swiatek
Assistant Examiner—Todd E. Manahan
Attorney, Agent, or Firm—Leon Gilden

[57] ABSTRACT

A container includes right and left side walls including right and left panels hingedly mounted to upper edges of the side walls. The panels include projecting tabs directed medially and coextensively aligned with rear edges of the panels. The tabs are received within complementarily configured slots formed within a rear panel hingedly mounted to a rear wall of the container. The invention further includes a unitary insert package containing absorbent litter therewithin and an absorbent pad formed to a bottom surface of the insert wherein the pad emits a deodorant upon moisturizing of the pad. The container is also optionally formed of transparent material whereupon positioning upon a support container, permits directing of ultra-violet light interiorly of the container and of the insert to effect sanitizing of litter utilized within the container for enhanced sanitary utilization of the invention.

1 Claim, 4 Drawing Sheets

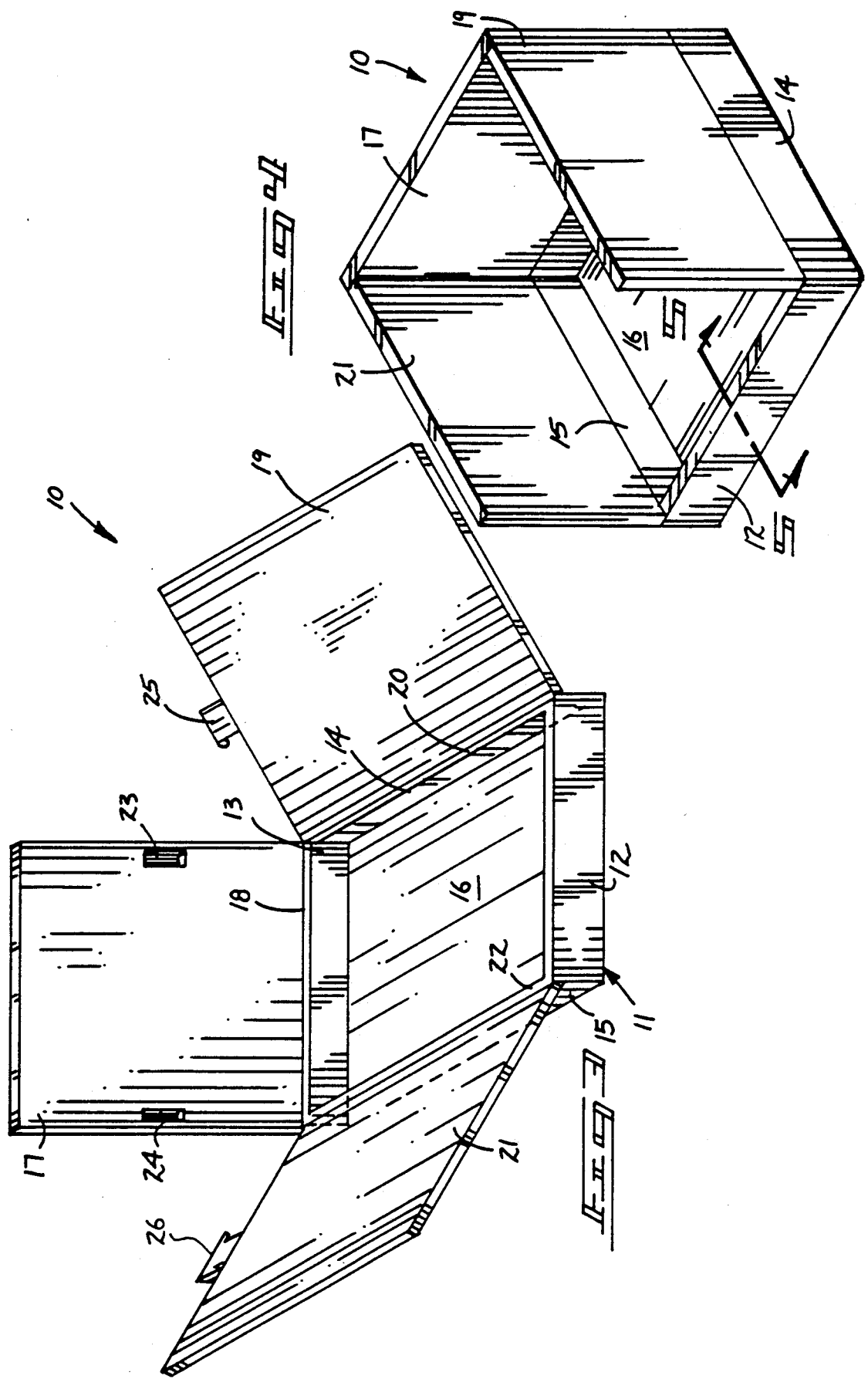

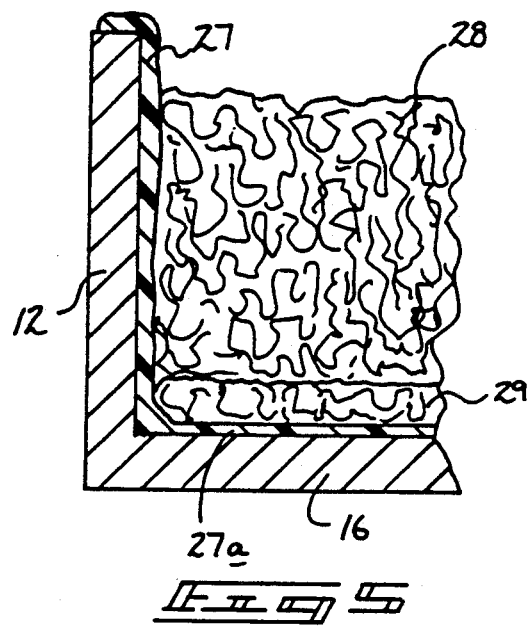
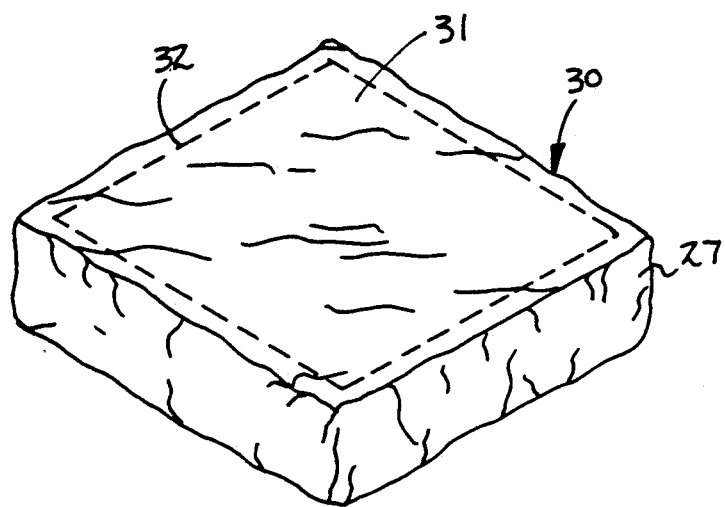

DISPOSABLE PET LITTER BOX

BACKGROUND OF THE INVENTION

1. Field of the Invention

The field of the invention relates to cat litter boxes, and more particularly pertains to a new and improved disposable pet litter box wherein the same is readily erected and subsequently disposed of subsequent to its use.

2. Description of the Prior Art

Pet litter boxes and particularly those utilized by cats are necessary when cats are kept within a dwelling. Litter utilized within such containers is provided to absorb moisture and the like for disposal of the litter and replenishment thereof within an associated cat litter box to accommodate a cat living within the same dwelling as an individual. While disposable cat litter boxes are available in the prior art, the instant invention attempts to overcome deficiencies of the prior art utilizing a coordinated cat litter box arrangement of enhanced use and ease of disposability. Examples of the prior art include U.S. Pat. No. 4,819,580 to FOLDES sets forth a litter box wherein a unitary receptacle includes a surrounding layer formed tubular polymeric film to enable enclosing of the litter box subsequent to its use to permit ease of disposal thereof.

U.S. Pat. No. 4,711,198 to MOSSBARGER provides a cardboard box interfitted with a plastic liner wherein a opening of a lid associated with the box, the liner is extended to provide the side embracing walls extending between the lid and the underlying container.

U.S. Pat. No. 4,782,788 to ARCAND provides a disposable litter box with various apertures and fold lines to enhance erection thereof for use.

U.S. Pat. No. 4,813,376 provides a cat litter tray wherein the tray is easily opened for use securing a fluid impermeable bag therewithin.

U.S. Pat. No. 4,791,883 to LEHMAN et al provides a disposable litter box wherein the box is configured for ease of shipment and subsequent opening for use as a cat litter box.

As such, it may be appreciated that there continues to be a need for a new and improved disposable pet litter box wherein the same addresses both the problems of ease of use as well as effectiveness in the containing and subsequent disposal of cat litter and in this respect, the present invention substantially fulfills this need.

SUMMARY OF THE INVENTION

In view of the foregoing disadvantages inherent in the known types of pet litter boxes now present in the prior art, the present invention provides a new and improved disposable pet litter box wherein the same provides an easily erected and subsequently disposed of cat litter box. As such, the general purpose of the present invention, which will be described subsequently in greater detail, is to provide a new and improved disposable pet litter box which has all the advantages of the prior art cat litter box construction and none of the disadvantages.

To attain this, the disposable pet litter box of the instant invention essentially includes a container includes right and left side walls including right and left panels hingedly mounted to upper edges of the side walls. The panels include protecting tabs directed medially and coextensively aligned with rear edges of the panels. The tabs are received within complementarily configured slots formed within a rear panel hingedly mounted to a rear wall of the container. The invention further includes a unitary insert package containing absorbent litter therewithin and an absorbent pad formed to a bottom surface of the insert wherein the pad emits a deodorant upon moisturizing of the pad. The container is also optionally formed of transparent material whereupon positioning upon a support container, permits directing of ultra-violet light interiorly of the container and of the insert to effect sanitizing of litter utilized within the container for enhanced sanitary utilization of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disposable pet litter box which has all the advantages of the prior art disposable pet litter boxes and none of the disadvantages.

It is another object of the present invention to provide a new and improved disposable pet litter box which may be easily and efficiently manufactured and marketed.

It is a further object of the present invention to provide a new and improved disposable pet litter box which is of a durable and reliable construction.

An even further object of the present invention is to provide a new and improved disposable pet litter box which is susceptible of a low cost of manufacture with regard to both materials and labor, and which accordingly is then susceptible of low prices of sale to the consuming public, thereby making such disposable pet litter boxes economically available to the buying public.

Still yet another object of the present invention is to provide a new and improved disposable pet litter box which provides in the apparatuses and methods of the prior art some of the advantages thereof, while simultaneously overcoming some of the disadvantages normally associated therewith.

Still another object of the present invention is to provide a new and improved disposable pet litter box which may be compactly stored when not being utilized.

Yet another object of the present invention is to provide a new and improved disposable pet litter box wherein the same accommodates ease of opening to accommodate a litter unit mounted therewithin as well as providing structure for sanitizing of the associated litter utilized to extend and prolong an effective life cycle of the arrangement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the container of the instant invention.

FIG. 4 is an isometric illustration of the container of the instant invention in an erected configuration.

FIG. 5 is an orthographic view taken along the lines 5—5 of FIG. 4 in the direction indicated by the arrows.

FIG. 6 is an isometric illustration of a container insert utilized by the instant invention.

DESCRIPTION OF THE PREFERRED EMBODIMENT

Figure 1:
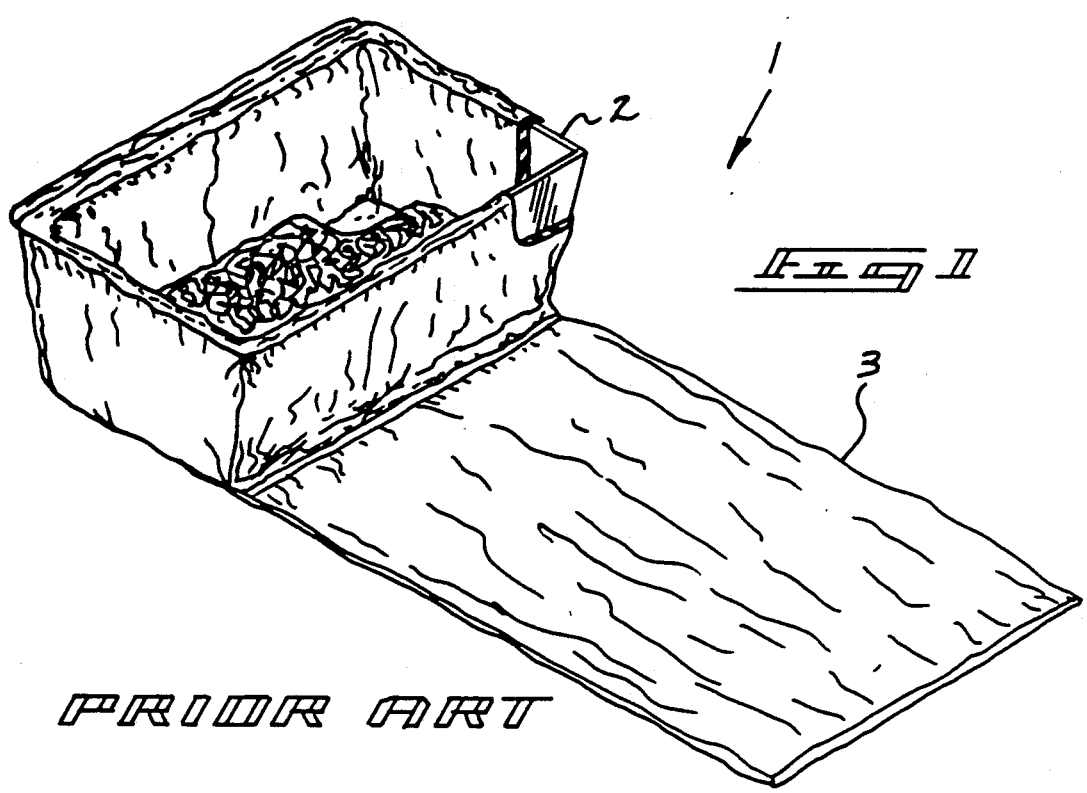
FIG. 1 is an isometric illustration of a prior art disposable pet litter box.

With reference now to the drawings, and in particular to FIGS. 1 to 8 thereof, a new and improved disposable pet litter box embodying the principles and concepts of the present invention and generally designated by the reference numerals 10 and 10a will be described.

Figure 2:
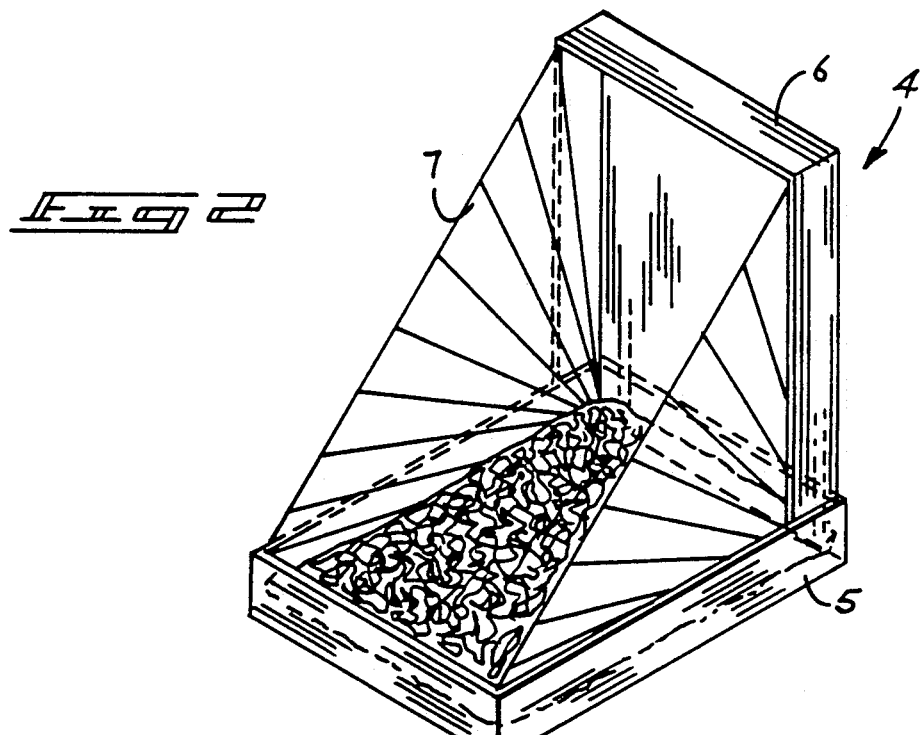
FIG. 2 is an isometric illustration of a further prior art pet litter box.

FIG. 1 illustrates a prior art disposable pet litter box 1 including a container 2 with an elongate polymeric bag 3 fixedly mounted to the container whereupon disposal of the container 2, the bag 3 permits enveloping of the container for its sanitary disposal. FIG. 2 illustrates a further prior art disposable litter box arrangement 4 wherein a container 5 includes a lid 6 pivotally mounted thereto with a liner 7 including side panels formed between the lid and the container extended during opening of the lid as illustrated.

More specifically, the disposable pet litter box 10 of the instant invention essentially comprises a container 11 including a forward wall 12, a rear wall 13 spaced parallel to an coextensive with a forward wall and right and left side walls 14 and 15 each orthogonally mounted to an underlying floor 16. A lid 17 of the container of substantially the identical configuration as defined by the floor 16 is hingedly mounted coextensively to an upper edge of the rear wall 13 at a coextensive hinge 18.

A right panel 19 and a left panel 21 each include a respective right and left panel hinge 20 and 22 mounting the respective right and left panels 19 and 21 coextensively to upper edges of the right and left side walls 14 and 15. A first slot 23 and a second slot 24 are directed through the lid 17 and are formed adjacent to and parallel to right and left respective side edges of the lid 17 in a parallel relationship relative to one another. The slots 23 and 24 are positioned to receive first and second L-shaped projections 25 and 26 coextensively formed to and extending rearwardly of rear edges of the right and left panels 19 and 21 to provide an erected structure as illustrated in FIG. 4. The container 11 is typically filled with an absorbent litter 28. The litter 28 is provided within an associated container insert 30 the container insert 30 includes a transparent polymeric film liner 27 defining side walls and a bottom wall 27a. A removable top wall 31 includes a series of perforations directed through the top wall and formed continuously therethrough in a spaced relationship relative to the upper terminal edges of the side walls of the insert to permit the side walls of the insert to extend a distance beyond the interior lineal height of each of the walls of the container as illustrated in FIG. 5 to ensure containment of discharge from an associated cat utilizing the litter within the container insert. Underlying the absorbent litter 28 is an absorbent cloth mat 29. The cloth mat 29 is formed coextensively with the floor 27a of the container insert 30 and includes a dry deodorant impregnated within the mat whereupon the deodorant is activated to mask odors directed from the litter in use by a cat.

Figure 7:
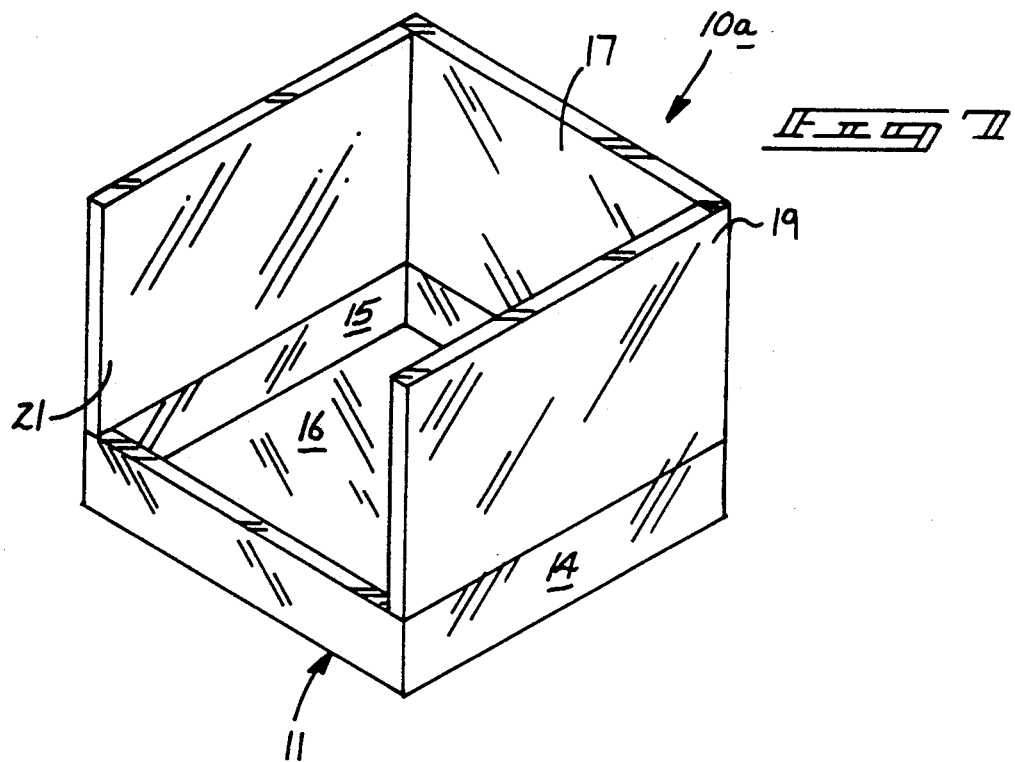
FIG. 7 is an isometric illustration of a modification of the instant invention utilizing transparent material construction.
Figure 8:
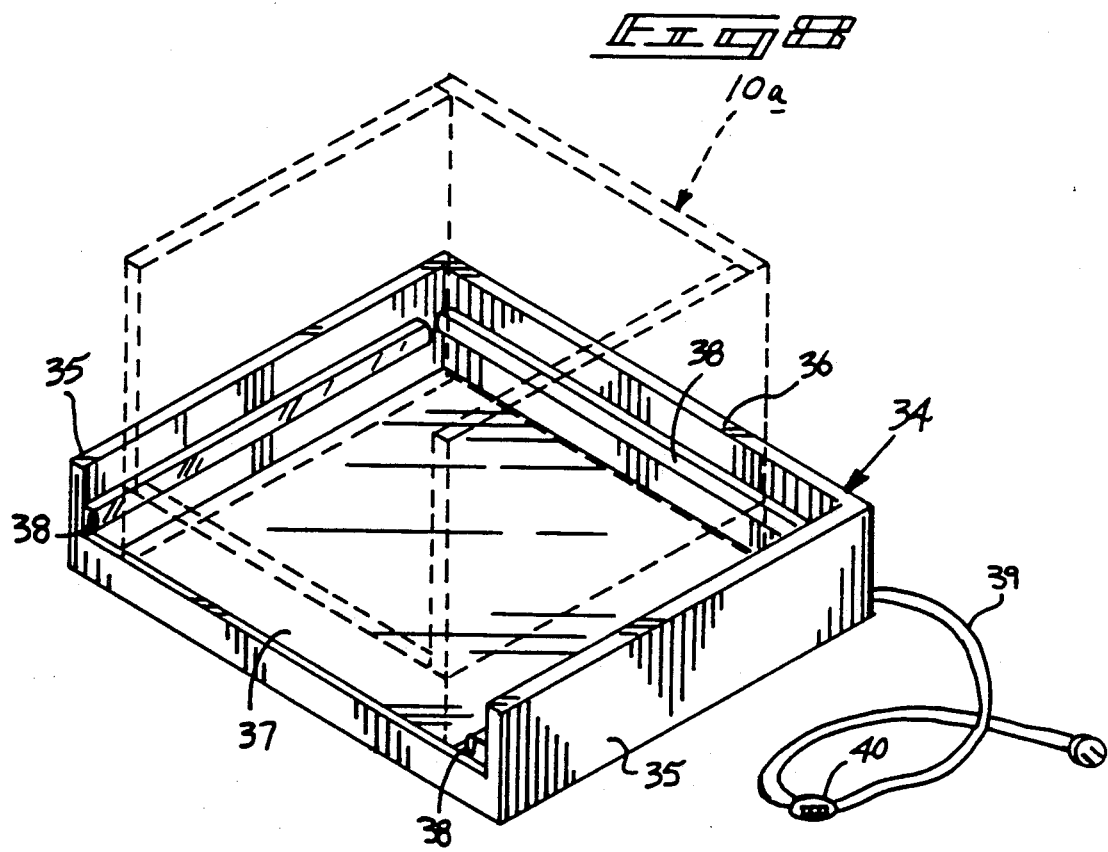
FIG. 8 is an isometric illustration of the modification of the instant invention in coordination with a sanitizing support container.

FIG. 7 illustrates a modification of the invention wherein the litter box 10a is defined by transparent construction where each of the walls as well as the side panels and lid are each transparent and preferably formed of a polymeric material. The transparent container 10a is mounted within a sanitizing support container 34. The support container 34 includes spaced parallel side walls 35 and a single rear wall 36 each orthogonally mounted to a support container floor 37. The floor 37 is of an area greater than that as defined by the floor 16 of the container 10a wherein ultra-violet light emitting bulbs 38 are mounted coextensively within and medially of each interior surface of the side walls 35 and the rear walls 36 to direct ultra-violet light into the litter 28 during use wherein the insert 30 is preferably also formed of a transparent polymeric material to permit directing of the light therewithin and upon stirring of the litter contents by a cat, the ultraviolet light penetrates a large percentage of the litter contained within the container 10a. An electrical transmission line 39 including an on-off switch 40 mounted therewithin electrically communicates the bulbs 38 with a convenient electrical source.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A disposable pet litter box comprising,
   a container including a forward wall, a rear wall parallel to and coextensive with the forward wall, and
   a right side wall and a left side wall wherein the left side wall and right side wall are arranged parallel to one another inter-communicatively connected with the forward wall and the rear wall, and
   a floor underlying and orthogonally connected to the forward wall, rear wall, right side wall, and left side wall, and
   a lid hingedly mounted to an upper edge of the rear wall, and coextensive with the rear wall, and
   a right panel hingedly mounted to an upper edge of the right side wall and coextensive therewith, and
   a left panel hingedly connected to and coextensively joined to an upper edge of the left side wall, the right panel and left panel of equal geometric configuration relative to one another, and
   the right panel including a (rearwardly extending) right projection extending rearwardly of a rear edge of the right panel, and
   the left panel including a left projection extending rearwardly and coextensively with a rear edge of the left panel, and
   the lid including a right slot and a left slot receiving the right projection and the left projection therewithin, and
   wherein the right slot and the left slot are arranged parallel to one another through the lid and positioned adjacent a respective right and left side edge of the lid medially thereof, and
   further including a transparent container insert, the insert including spaced side walls, a forward wall, and a rear wall mounted to a floor, and a top panel mounted coextensively to upper edges of the walls, and the top panel including a continuous perforation spaced within the top panel spaced from the walls for removal of a central portion of the top panel, and the insert further including a predetermined quantity of absorbent litter contained therewithin, and
   wherein the insert further includes an absorbent mat coextensively mounted overlying an interior surface of the floor of the insert, and the mat impregnated with a deodorant therethrough, and
   wherein the right side wall, left side wall, floor, lid, right panel and left panel are each formed of a transparent polymeric material, and
   further including a sanitizing support container, the support container including support container side walls, and a support container rear wall, the support container side walls and the support container rear walls orthogonally mounted to an underlying support container floor, the support container floor defining an area greater than the area of the floor of the litter box, and each interior surface of each side wall and rear wall including an ultra-violet light emitting bulb mounted therealong, and the litter box mounted on the support container floor.

* * * * *